US012615303B2

(12) United States Patent
Nguyen et al.

(10) Patent No.: US 12,615,303 B2
(45) Date of Patent: *Apr. 28, 2026

(54) NOTE CAPTURE VIA PARTICIPANT DEVICES IN COMMUNICATION SESSIONS

(71) Applicant: Zoom Communications, Inc., San Jose, CA (US)

(72) Inventors: Thanh Le Nguyen, Belle Chasse, LA (US); Shane Paul Springer, Oregon City, OR (US)

(73) Assignee: Zoom Communications, Inc., San Jose, CA (US)

( * ) Notice: Subject to any disclaimer, the term of this patent is extended or adjusted under 35 U.S.C. 154(b) by 10 days.

This patent is subject to a terminal disclaimer.

(21) Appl. No.: 18/779,410

(22) Filed: Jul. 22, 2024

(65) Prior Publication Data

US 2024/0380799 A1 Nov. 14, 2024

Related U.S. Application Data

(63) Continuation of application No. 18/366,264, filed on Aug. 7, 2023, now Pat. No. 12,074,927, which is a continuation of application No. 17/555,387, filed on Dec. 18, 2021, now Pat. No. 11,770,422.

(51) Int. Cl.
| | |
|---|---|
| *H04L 65/402* | (2022.01) |
| *H04L 65/401* | (2022.01) |
| *H04L 65/403* | (2022.01) |

(52) U.S. Cl.
CPC ...... *H04L 65/4025* (2022.05); *H04L 65/4015* (2013.01); *H04L 65/403* (2013.01)

(58) Field of Classification Search
None
See application file for complete search history.

(56) References Cited

U.S. PATENT DOCUMENTS

| | | | | |
|---|---|---|---|---|
| 9,329,833 B2 * | 5/2016 | Swierk | .................. | G06F 3/167 |
| 9,338,199 B2 * | 5/2016 | Paulik | .................. | H04L 65/403 |
| 11,374,988 B1 | 6/2022 | Lanier | | |
| 11,381,408 B2 * | 7/2022 | Tofighbakhsh | ......... | H04W 4/06 |
| 11,729,227 B1 * | 8/2023 | Knas | ..................... | H04L 65/403 |
| | | | | 709/204 |
| 11,770,422 B2 | 9/2023 | Le Nguyen et al. | | |
| 2015/0149540 A1 * | 5/2015 | Barker | ................ | H04L 12/1831 |
| | | | | 709/204 |
| 2015/0149929 A1 * | 5/2015 | Shepherd | ............ | H04L 12/1822 |
| | | | | 715/753 |

(Continued)

FOREIGN PATENT DOCUMENTS

| | | | | |
|---|---|---|---|---|
| CN | 110457095 B | * | 12/2022 | ......... H04L 12/1818 |
| WO | 2019199890 A1 | | 10/2019 | |
| WO | 2022010950 A1 | | 1/2022 | |

*Primary Examiner* — Phyllis A Book
(74) *Attorney, Agent, or Firm* — Young Basile Hanlon & MacFarlane, P.C.

(57) ABSTRACT

Session content is presented during a communication session to the participant devices. The participant devices transmit requests for notes to be generated for the session content. One or more segments of the communication session are determined when a threshold number of participant devices that requested notes to be generated is exceeded. Information associated with the one or more segments is transmitted to a participant device of the participant devices.

20 Claims, 11 Drawing Sheets

(56)  References Cited

U.S. PATENT DOCUMENTS

| | | | |
|---|---|---|---|
| 2015/0154291 A1 | 6/2015 | Shepherd et al. | |
| 2015/0169069 A1* | 6/2015 | Lo ......................... | H04L 65/403 |
| | | | 715/753 |
| 2015/0215351 A1 | 7/2015 | Barzuza et al. | |
| 2015/0310507 A1* | 10/2015 | Woodward ............ | H04L 65/403 |
| | | | 705/329 |
| 2016/0073054 A1* | 3/2016 | Balasaygun ........ | H04L 12/1822 |
| | | | 348/14.08 |
| 2016/0165009 A1 | 6/2016 | Assem Aly Salama et al. | |
| 2016/0188125 A1 | 6/2016 | Kaplan et al. | |
| 2016/0234268 A1 | 8/2016 | Ouyang et al. | |
| 2017/0169726 A1* | 6/2017 | Aguirre ................... | G09B 5/02 |
| 2018/0007100 A1 | 1/2018 | Krasadakis | |
| 2018/0098030 A1 | 4/2018 | Morabia et al. | |
| 2018/0241882 A1* | 8/2018 | Lee ........................ | H04N 7/147 |
| 2018/0375676 A1 | 12/2018 | Bader-Natal et al. | |
| 2019/0088153 A1 | 3/2019 | Bader-Natal et al. | |
| 2019/0124128 A1 | 4/2019 | Bader-Natal et al. | |
| 2019/0386840 A1* | 12/2019 | Griffin ................ | H04L 12/1831 |
| 2020/0153915 A1 | 5/2020 | Jain et al. | |
| 2020/0320478 A1* | 10/2020 | Crawford ............ | H04L 65/1066 |
| 2020/0380468 A1 | 12/2020 | Crawford et al. | |
| 2020/0382618 A1 | 12/2020 | Faulkner et al. | |
| 2021/0058264 A1* | 2/2021 | Fahrendorff ........ | H04L 12/1822 |
| 2021/0399911 A1 | 12/2021 | Jorasch et al. | |
| 2021/0400142 A1 | 12/2021 | Jorasch et al. | |
| 2022/0014580 A1 | 1/2022 | Shadfar et al. | |
| 2022/0086393 A1* | 3/2022 | Peters .................... | H04N 7/147 |
| 2022/0138470 A1 | 5/2022 | Seleskerov et al. | |
| 2022/0141532 A1 | 5/2022 | Li et al. | |
| 2022/0247975 A1 | 8/2022 | Lanier | |
| 2022/0405630 A1* | 12/2022 | Harrison ............ | G06Q 10/0639 |

* cited by examiner

150

102

PROCESSING ENGINE

CONNECTION MODULE
152

SEGMENTS MODULE

ENGAGEMENT METRICS
MODULE
156

PRESENTATION MODULE
158

MAINTAIN A COMMUNICATION SESSION WITH PARTICIPANTS — 212

DETERMINE SEGMENTS WHERE PARTICIPANTS BEYOND A THRESHOLD REQUESTED NOTES TO BE GENERATED — 214

DETERMINE ENGAGEMENT METRICS FOR PARTICIPANTS — 216

PRESENT INFORMATION CORRESPONDING TO ENGAGEMENT METRICS — 218

NOTE CAPTURE VIA PARTICIPANT DEVICES IN COMMUNICATION SESSIONS

CROSS-REFERENCE TO RELATED APPLICATION(S)

This application is a continuation of U.S. patent application Ser. No. 18/366,264, filed Aug. 7, 2023, which is a continuation of U.S. patent application Ser. No. 17/555,387, filed Dec. 18, 2021, the entire disclosures of which are hereby incorporated by reference.

FIELD

The present application relates generally to digital communication, and more particularly, to systems and methods for presenting real-time engagement analytics for communication sessions.

SUMMARY

The appended claims may serve as a summary of this application.

BRIEF DESCRIPTION OF THE DRAWINGS

The present application relates generally to digital communication, and more particularly, to systems and methods providing for dynamically generating a note with captured content from a communication session.

The present disclosure will become better understood from the detailed description and the drawings, wherein.

DETAILED DESCRIPTION OF THE DRAWINGS

Figure 1A:
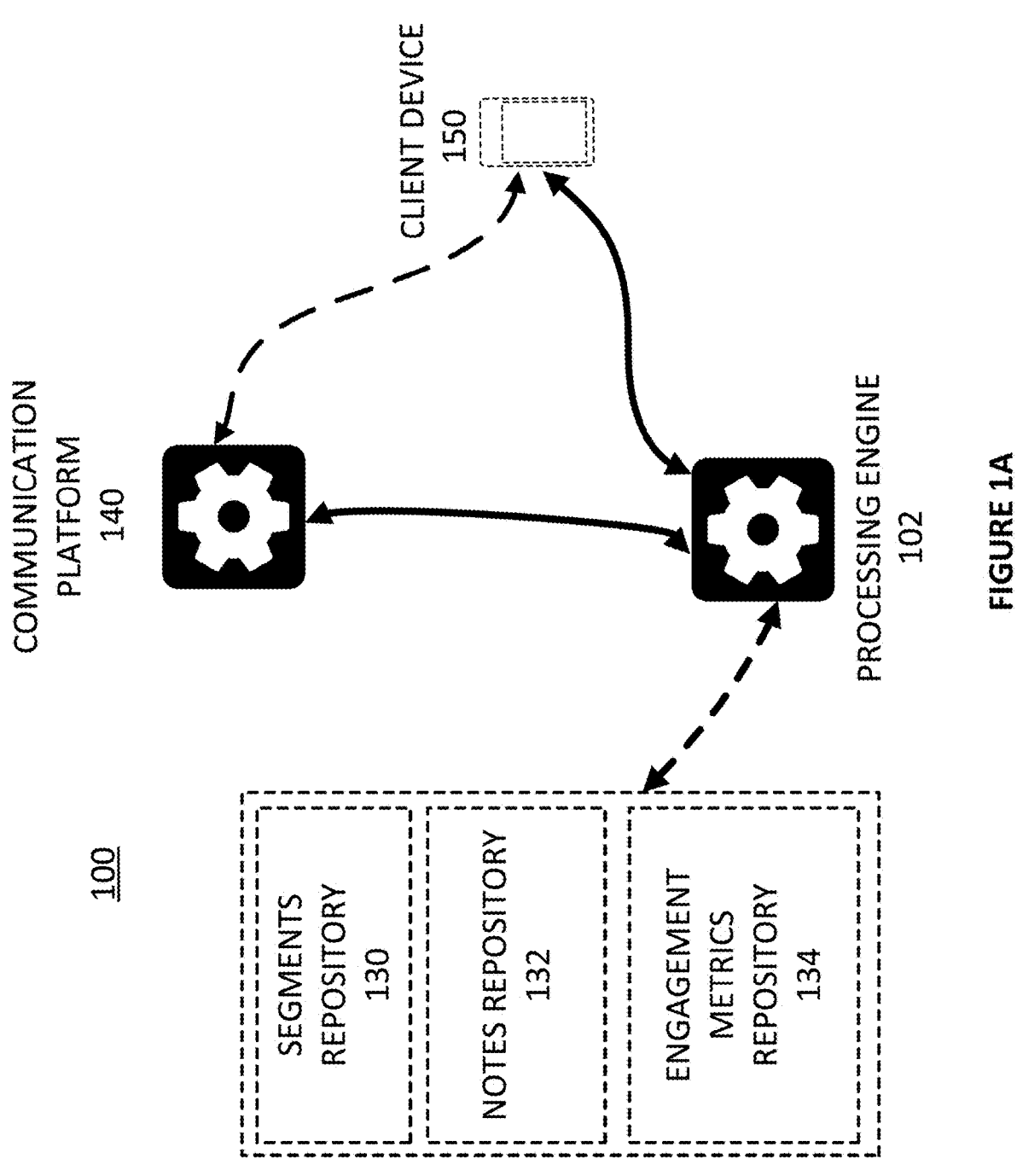
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

During a remote communication session, such as a remote video presentation, participants may be inclined to take notes of certain presented information that they deem to be important or they wish to study later. Since education is increasingly taking place during remote video-based communication sessions, students will frequently want to take notes on material being presented by teachers, such as, e.g., presentation slides, spoken content, or material that the teacher writes on a physical or virtual whiteboard.

However, this process of note-taking during a communication session is often neither easy nor streamlined. For example, if a student sees a presentation slide that she wishes to save for later study, she may have to follow a number of steps, including performing a full screen capture of her computer screen, switching to the screen capture application, manually cropping the full screen capture to just the presentation slide, then copying the cropped image to her notes document. While she is performing these steps, the teacher has moved on to additional material that she has been unable to keep up with and take notes on. Even just a few seconds of such a distraction can be costly when a student needs to absorb every moment of a lecture.

One way to resolve these issues is through digital capture of notes during communication sessions. A system can dynamically generate a note with captured content from the communication session. This system can function as a dynamic clipboard by capturing previous snippets from the meeting's content, as well as potentially snippets recorded after the note request, to include in the note. The meeting content may be, e.g., presentation slides, graphs, portions of a video presentation with a presenter appearing on a live video feed, transcripts of a presenter speaking, or any other suitable content. While the meeting occurs, a buffer can be continually written or overwritten with a recording of the session content. Upon the participant interacting with the UI element, a designated portion of the session content that was just written to the buffer is used for generating a note. This may be, for example, the previous 15 seconds of the session content. In some embodiments, additional session content after the participant selects the UI element is also recorded and used for generating the note. For example, the previous 15 seconds before the participant selecting the UI element, as well as the 15 seconds directly following the participant selecting the UI element, are captured within the note. The participant can then access and play back the note at a later time.

While this method of capturing notes is far superior to the previous methods of doing so, there is still a lack of tools for providing analytics and engagement metrics around note-taking. Such tools would potentially be useful for presenters and hosts as well as the participants who are taking notes themselves. Currently, presenters present material during communication sessions without having a clear understanding of what portions of their presentation are particular resonating with or engaging the audience, and without having a clear understanding of which parts of the presentation the audience considers particularly noteworthy. Presenters also lack a clear understanding of how many participants listening to the presentation are actively engaged at any particular time, and potentially, which specific participants are more engaged or less engaged with the material.

For example, a teacher providing a lecture to a class may wish to know which students are struggling to be engaged during the class, so that the teacher can make some effort to engage those students more actively by asking questions or asking those students to participate in some way. Similarly, if an entire class appears to be lacking in attention during a specific part of a lecture, the teacher may learn that this is a part of the lecture that needs to be livened up somehow, such as by introducing more active participation from the class at this time. Furthermore, such analytics and engagement metrics would be useful to have in real time, in the moment of the material being presented, so that the presenter can change course and take action to re-engage with the audience while the presentation is still underway.

Furthermore, participants themselves would find such analytics and engagement metrics useful in a number of ways. For example, students in a class would have some insight into what parts of a lecture were considered most noteworthy and worth knowing about within that lecture, as well as parts of the lecture other students didn't take special note of which may provide the student with an advantage by knowing about. Analytics may also be presented which compare the participant's own engagement and note-taking habits with that of their peers in the communication session. They may thus gain a better perspective on how they are faring compared to others in terms of engagement with the material, and where they may need to improve. If such analytics are presented in real time during the communication session, then participants can be informed that they are lacking in attention compared to other participants and should take a more active, engaged, or attentive role in the session.

Thus, there is a need in the field of digital communication tools and platforms to create new and useful systems and methods for presenting note analytics and engagement metrics to a participant, e.g., a presenter, a host, or a non-presenting participant. Such note analytics and engagement metrics would provide useful information for presenters as well as those who are taking in presentations, and would provide useful in-the-moment knowledge that can be acted upon immediately.

In one embodiment, a method maintains a communication session with a number of participants, wherein session content is presented during the communication session to the participants, and wherein participants can request real-time notes to be generated for the session content to be captured. The method determines one or more engagement metrics for participants based on the participants requesting real-time notes to be generated during the communication session. Finally, the method presents, to one or more participants of the communication session, information corresponding to at least a subset of the determined engagement metrics.

Further areas of applicability of the present disclosure will become apparent from the remainder of the detailed description, the claims, and the drawings. The detailed description and specific examples are intended for illustration only and are not intended to limit the scope of the disclosure.

FIG. 1A is a diagram illustrating an exemplary environment in which some embodiments may operate. In the exemplary environment 100, a client device 150 is connected to a processing engine 102 and, optionally, a communication platform 140. The processing engine 102 is connected to the communication platform 140, and optionally connected to one or more repositories and/or databases, including, e.g., a recording buffer 130, notes repository 132, and/or an annotations repository 134. One or more of the databases may be combined or split into multiple databases. The user's client device 150 in this environment may be a computer, and the communication platform 140 and processing engine 102 may be applications or software hosted on a computer or multiple computers which are communicatively coupled via remote server or locally.

The exemplary environment 100 is illustrated with only one client device, one processing engine, and one communication platform, though in practice there may be more or fewer additional client devices, processing engines, and/or communication platforms. In some embodiments, the client device(s), processing engine, and/or communication platform may be part of the same computer or device.

Figure 2:
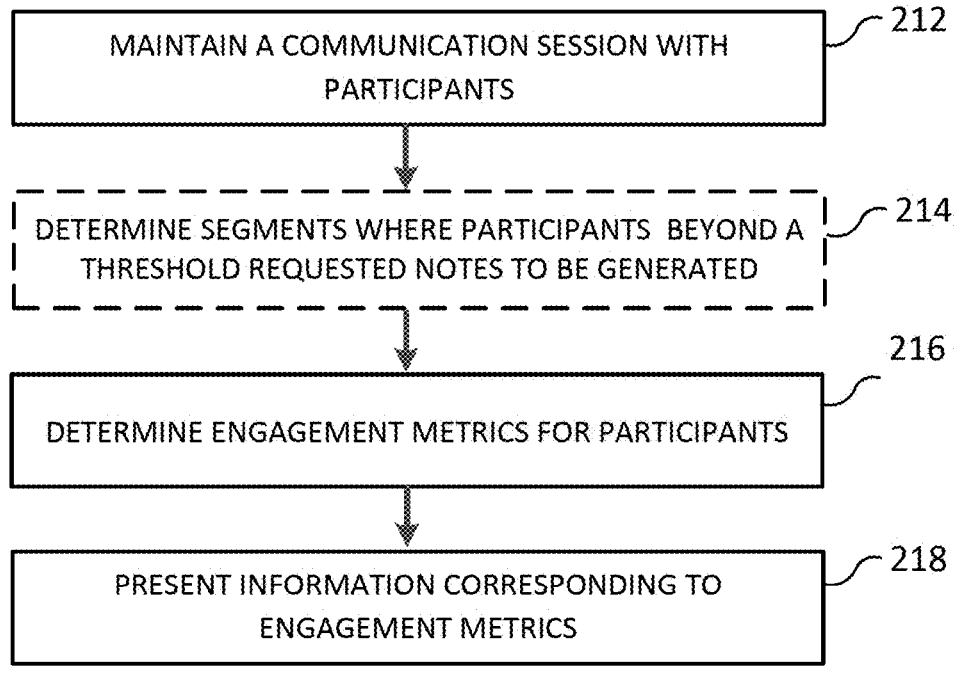
FIG. 2 is a flow chart illustrating an exemplary method that may be performed in some embodiments.

In an embodiment, the processing engine 102 may perform the exemplary method of FIG. 2 or other method herein and, as a result, present engagement analytics from a communication session. In some embodiments, this may be accomplished via communication with the client device, processing engine, communication platform, and/or other device(s) over a network between the device(s) and an application server or some other network server. In some embodiments, the processing engine 102 is an application, browser extension, or other piece of software hosted on a computer or similar device, or is itself a computer or similar device configured to host an application, browser extension, or other piece of software to perform some of the methods and embodiments herein.

The client device 150 is a device with a display configured to present information to a user of the device who is a participant of the video communication session. In some embodiments, the client device presents information in the form of a visual UI with multiple selectable UI elements or components. In some embodiments, the client device 150 is configured to send and receive signals and/or information to the processing engine 102 and/or communication platform 140. In some embodiments, the client device is a computing device capable of hosting and executing one or more applications or other programs capable of sending and/or receiving information. In some embodiments, the client device may be a computer desktop or laptop, mobile phone, virtual assistant, virtual reality or augmented reality device, wearable, or any other suitable device capable of sending and receiving information. In some embodiments, the processing engine 102 and/or communication platform 140 may be hosted in whole or in part as an application or web service executed on the client device 150. In some embodiments, one or more of the communication platform 140, processing engine 102, and client device 150 may be the same device. In some embodiments, the user's client device 150 is associated with a first user account within a communication platform, and one or more additional client device(s) may be associated with additional user account(s) within the communication platform.

In some embodiments, optional repositories can include one or more of a segments repository 130, notes repository 132, and/or engagement metrics repository 134. The optional repositories function to store and/or maintain, respectively, segments of communication sessions that contain sufficiently high requests for notes to be generated; notes that are generated for participants within communication sessions; and engagement metrics of participants within communication sessions. The optional database(s) may also store and/or maintain any other suitable information for the processing engine 102 or communication platform 140 to perform elements of the methods and systems herein. In some embodiments, the optional database(s) can be queried by one or more components of system 100 (e.g., by the processing engine 102), and specific stored data in the database(s) can be retrieved.

Communication platform 140 is a platform configured to facilitate meetings, presentations (e.g., video presentations) and/or any other communication between two or more parties, such as within, e.g., a video conference or virtual classroom. A video communication session within the communication platform 140 may be, e.g., one-to-many (e.g., a participant engaging in video communication with multiple attendees), one-to-one (e.g., two friends remotely communication with one another by video), or many-to-many (e.g., multiple participants video conferencing with each other in a remote group setting).

Figure 1B:
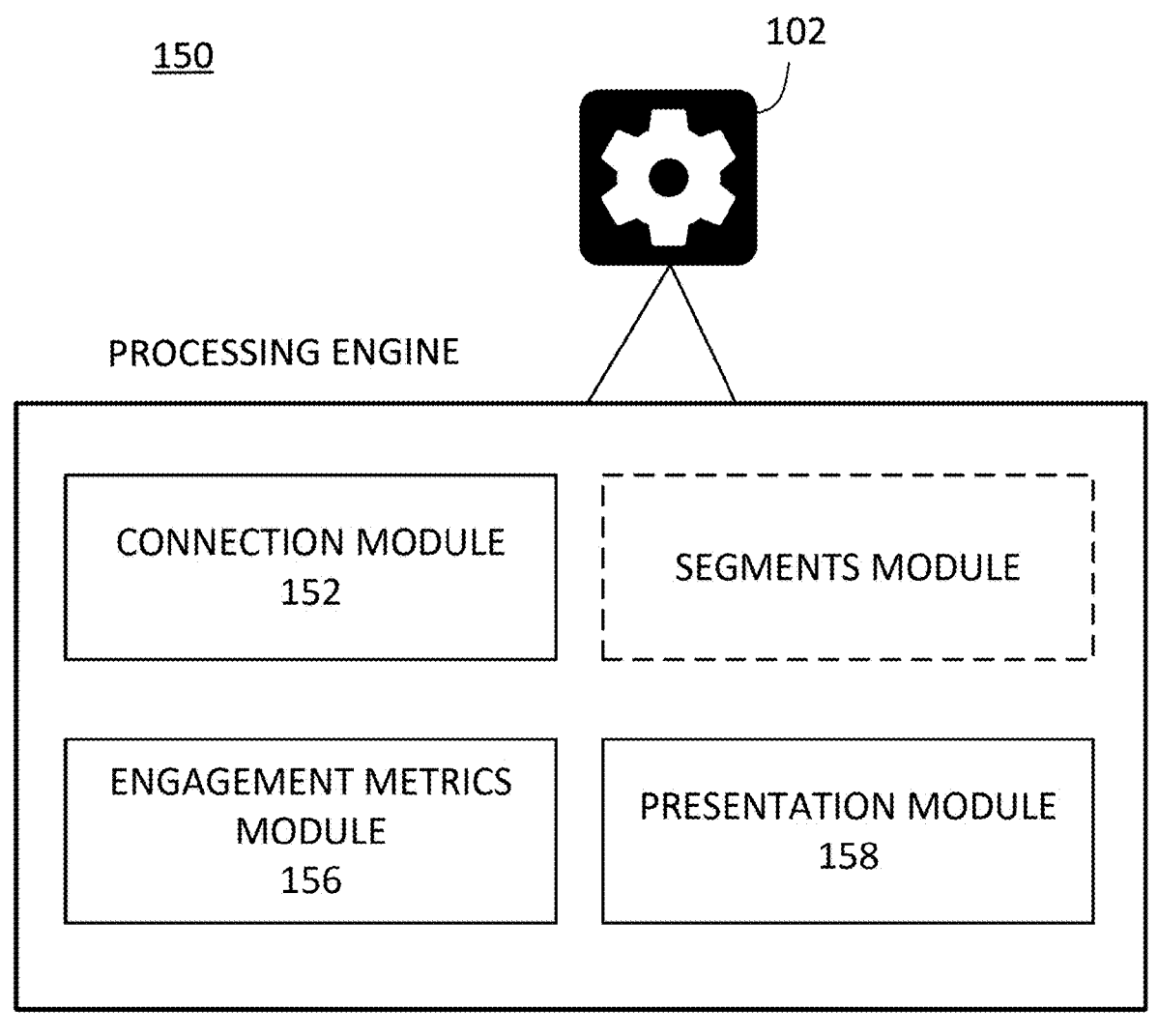
FIG. 1B is a diagram illustrating an exemplary computer system that may execute instructions to perform some of the methods herein.

FIG. 1B is a diagram illustrating an exemplary computer system 150 with software modules that may execute some of the functionality described herein. In some embodiments, the modules illustrated are components of the processing engine 102.

Connection module 152 functions to maintain a communication session with a number of participants.

Optional segments module 154 functions to determine segments within the communication session where participants beyond a threshold number requested real-time notes to be generated for session content being produced within the communication session.

Engagement metrics module 156 functions to determine one or more engagement metrics for participants based on the participants requesting real-time notes to be generated during the communication session.

Presentation module 158 functions to present, to one or more participants of the communication session, information corresponding to at least a subset of the determined engagement metrics.

The above modules and their functions will be described in further detail in relation to an exemplary method below.

FIG. 2 is a flow chart illustrating an exemplary method that may be performed in some embodiments.

At step 212, the system maintains a communication session with a number of participants, wherein session content is presented during the communication session to the participants, and wherein participants can request real-time notes to be generated for the session content to be captured.

The communication session can include session content in a number of potential ways. In some embodiments, the session content is presentation content presented by one or more presenting participants. For example, a presenter can present a number of presentation slides during the communication session. The presenter can also speak as he presents each slide, and potentially appear on video as well. In some embodiments, one or more presenters can present a prepared video while speaking. Other possibilities may include a presenter presenting a document such as a PDF or Word document, a presenter sharing his screen while talking, or a presenter drawing on a virtual whiteboard as he speaks. In some embodiments, rather than one or more presenters presenting material, the session content can include video, audio, or images from a number of participants as they discuss something, or engage in question-and-answer sessions. In some embodiments, audio and/or video streams of the one or more presenting participants can be included. In some embodiments, a portion of a transcript from the communication session can be included. This transcript may be automatically generated during the communication session, then included as session content. Many other such possibilities may be contemplated.

In some embodiments, the system maintains the communication session by connecting participants to a live communication stream via their respective client devices. The communication stream may be any "session" (such as an instance of a video conference, webinar, informal chat session, or any other suitable session) initiated and hosted via the communication platform, for remotely communicating with one or more users of the communication platform, i.e., participants within the communication session. Participants are connected on user devices, and are associated with user accounts within the communication platform.

In some embodiments, the UI for the communication session is displayed on the client device of each participant. In some embodiments, the UI appears different for different participants, or has different UI elements included for different participants depending on their user permissions, access levels (e.g., a premium-tier business user account as compared to a free-tier user account), or other aspects that may differentiate one participant from another within the communication platform. In various embodiments, the UI is configured to allow the participant to, e.g., navigate within the communication session, engage or interact with one or more functional elements within the communication session, control one or more aspects of the communication session, and/or configure one or more settings or preferences within the communication session.

In some embodiments, the system receives a number of video feeds depicting imagery of a number of participants, the video feeds each having multiple video frames. In some embodiments, the video feeds are each generated via an external device, such as, e.g., a video camera or a smartphone with a built-in video camera, and then the video content is transmitted to the system. In some embodiments, the video content is generated within the system, such as on a participant's client device. For example, a participant may be using her smartphone to record video of herself giving a lecture. The video can be generated on the smartphone and then transmitted to the processing system, a local or remote repository, or some other location. In some embodiments, one or more of the video feeds are pre-recorded and are retrieved from local or remote repositories. In various embodiments, the video content can be streaming or broadcasted content, pre-recorded video content, or any other suitable form of video content. The video feeds each have multiple video frames, each of which may be individually or collectively processed by the processing engine of the system.

In some embodiments, the video feeds are received from one or more video cameras connected to a client device associated with each participant. Thus, for example, rather than using a camera built into the client device, an external camera can be used which transmits video to the client device, or some combination of both.

In some embodiments, the participants are users of a communication platform, and are connected remotely within a virtual communication room generated by the communication platform. This virtual communication room may be, e.g., a virtual classroom or lecture hall, a group room, a breakout room for subgroups of a larger group, or any other suitable communication room which can be presented within a communication platform. In some embodiments, synchronous or asynchronous messaging may be included within the communication session, such that the participants are able to textually "chat with" (i.e., sends messages back and forth between) one another in real time.

In some embodiments, the UI includes a number of selectable UI elements. For example, one UI may present selectable UI elements along the bottom of a communication session window, with the UI elements representing options the participant can enable or disable within the video session, settings to configure, and more. For example, UI elements may be present for, e.g., muting or unmuting audio, stopping or starting video of the participant, sharing participant's screen with other participants, recording the video session, and/or ending the video session.

In some embodiments, one or more UI elements may be present for taking a note. For example, a button may appear within the UI that reads "Take a Note". Upon the user clicking on the button or otherwise interacting with it, a request is initiated for the system to generate a note at that time. The system can then generate a note, which will be described in further detail below. An example of a UI element for taking a note will be discussed below with respect to FIG. 3.

In some embodiments, at least a portion of the UI displays a number of participant windows. The participant windows correspond to the multiple participants in the video communication session. Each participant is connected to the video communication session via a client device. In some embodiments, the participant window may include video, such as, e.g., video of the participant or some representation of the participant, a room the participant is in or virtual background, and/or some other visuals the participant may wish to share (e.g., a document, image, animation, or other visuals). In some embodiments, the participant's name (e.g., real name or chosen username) may appear in the participant window as well. One or more participant windows may be hidden within the UI, and selectable to be displayed at the user's discretion. Various configurations of the participant windows may be selectable by the user (e.g., a square grid of participant windows, a line of participant windows, or a single participant window). In some embodiments, the participant windows are arranged in a specific way according to one or more criteria, such as, e.g., current or most recent verbal participation, host status, level of engagement, and any other suitable criteria for arranging participant windows. Some participant windows may not contain any video, for example, if a participant has disabled video or does not have a connected video camera device (e.g. a built-in camera within a computer or smartphone, or an external camera device connected to a computer).

In some embodiments, the system generates notes by writing or overwriting a recording buffer with portions of the session content while the communication session is underway. This is performed in real time during the communication session, and the writing or overwriting is done continually during the communication session. Upon the recording buffer being written to capacity, the recording buffer can be configured to be overwritten with portions of the session content such that session content is always being recorded to the buffer, regardless of its size. In some embodiments, the recording buffer is located on the local client device of each participant, such that the recording is performed locally to the client device. In other embodiments, the buffer is located remotely, such as on a remote cloud data server.

In various embodiments, the recording buffer may potentially be any buffer with any possible amount of storage space allocated to that buffer. In some embodiments, the buffer is configured to record audio, video, image captures, or any other media. In some embodiments, multiple buffers are used individually or in combination to record media. For example, one buffer may be used to record only audio, another buffer may record only video, and yet another buffer may only contain captured images. In some embodiments, the buffer may include time stamps or may be synced in time with the duration of the communication session.

In one example, a local buffer with 500 MB allocated to it continually records audio and video of session content occurring during the communication session to a local client device of a participant. Upon the 500 MB capacity being reached, the buffer begins overwriting previously recorded content with session content as it is being produced. The buffer continually overwrites itself with new session content during the full duration of the communication session, and ends recording only once the communication session has terminated.

In some embodiments, the portions of the session content written to the recording buffer include only portions of presentation content and portions of audio and/or video streams of the one or more presenting participants, and do not include any portions of audio and/or video streams from non-presenting participants. This ensures, for example, that only the presenter(s) will be recorded for the purpose of generating notes, and never the attendees who will be recorded. In some embodiments, audio and/or video which includes non-presenting participants can be redacted or removed from the recorded session content. For example, blocks of audio where a non-presenting participant asks a question can be "bleeped", i.e., the audio of that participant is replaced with a single tone, white noise, silence, or similar replacement. Similar, blocks of video that include a non-presenting participant can be replaced by a black screen, a replacement image, blurred video, or similar. In some embodiments, such blocks may simply by skipped and not included in the recording to the buffer, or included in the buffer but not included in a note to be generated.

In some embodiments, the system can receive a request from one of the participants to generate a note. This request is received concurrently to the recording buffer being written or overwritten with session content. In some embodiments, this request to generate a note is initiated by the participant interactively selecting a UI element for taking a note. For example, a button in the lower right corner of the UI shown to the participant may read "Take a Note". Upon the user selecting that button, the system receives a request from that participant to generate a note during that time. Such an example will be further described below with respect to FIG. 3.

In some embodiments, the system receives an indication that a request to generate a note has been received from at least one participant of the communication session. The system then displays a notification within the UI of one or more additional participants that the first participant has requested a note to be generated for the current session content. For example, upon Anna requesting a note to be generated, other participants can receive a notification within the UI that Anna took a note on this material. Alternatively, rather than the notification including Anna's name, it may simply note that one participant has taken a note on the material. In some embodiments, rather than notifying when a single participant has taken a note, the system may notify only when a threshold number of participants taking notes has been exceeded.

In some embodiments, the system may be configured to detect one or more automated note taking conditions. The system may then automatically initiate the request to generate the note on behalf of the participant upon the detecting of the automated note taking condition(s). In this way, notes can be automatically generated for participants without them needing to select a note taking UI element. In some embodiments, the specific automated note taking conditions can be selected, customized, or adjusted by the participant in a settings, preferences, or options UI. Some examples of automated note taking conditions can include, e.g., the system receiving an indication of a number of participants exceeding a threshold requesting a note to be generated; the system receiving an indication or cue that the presenter considers the material to be noteworthy or otherwise indicates that the material should be captured by students; the system receives an indication that one or more key words or phrases have been detected in the session content; the system receives an indication that the participant's immediate supervisor or superior is speaking or presenting; or any other suitable conditions which may trigger the automatic generation of a note in a session.

In some embodiments, upon receiving a request to generate a note, the system can generate a note including at least a designated portion of the session content written to the recording buffer prior to or at the moment of receiving the request. In some embodiments, the generated note is associated specifically with the requesting participant who requested the note to be generated, and remains connected to that participant's account or user profile within the communication platform for future playback and access. The designated portion of the session content to be included in the note is designated based on a prespecified amount or window of time in which recorded content from the buffer is to be included. For example, a note may be generated 13 minutes into the communication session. If the prespecified amount of time for recorded content to be included is 30 seconds prior to the request to generate the note is received, then 30 seconds of recorded session content prior to receiving the request is included in the generated note. Therefore, content from 12:30 to 13:30 of the communication session is included in the note, resulting in a note with 1 minute of recorded session content.

In some embodiments, the note that is generated can additionally include a portion of a generated transcript that corresponds to or is time-synced with the designated portion of the session content to be included. In some embodiments, the system generates, in real time, a transcript for the session content as it is being produced within the communication session. The note the system generates then includes a subset of the generated transcript for the session content that corresponds to the portion of the session content in the note.

In some embodiments, when generating the note, the system automatically crops one or more visual portions of the designated session content written to the recorded buffer to remove one or more UI elements visible in the designated session content. For example, the system can crop out portions of the recording which include participant windows with audio or video feeds from non-presenting participants. The system can also crop out all participant windows to include only presentation content without any live video streams of presenting or non-presenting participants. UI elements can also be cropped out. Many other such possibilities for cropping out content can be included.

In some embodiments, after receiving the request to generate the note, the system continues to write or overwrite the recording buffer with portions of the session content. The note generated by the system additionally include a designated portion of the session content written to the recording buffer after receiving the request. For example, in addition to 30 seconds of previous session content material being included in the generated note, an additional 30 seconds of material after the request is received is included. That is, after receiving the request, 30 more seconds of material is recorded, then the note is generated to include both 30 seconds of recorded material prior to the request being received, and 30 seconds of recorded material after the request is received. In this way, participants may have the benefit of a captured note which includes a full context of the material before and after the participant's decision to take a note, thus ensuring no important material has been missed.

In some embodiments, the designated portion of the session content to be included in the note is configured to be adjustable by one or more participants with granted permission. In some embodiments, the designated portion can be adjusted in a settings, preferences, or options UI prior to the note being generated. For example, either during a communication session or at a time prior to the communication session, the participant can navigate within a UI to a settings UI to configure a number of settings for communication sessions. One of the options for configuration within the settings UI can be an option to adjust the amount of time of recording to be included when taking a note. In varying embodiments, the amount of time to be adjusted can correspond to the amount of recorded material to include from prior to the participant requesting the note; the amount of recorded material to include from after the participant requests the note; or both. The system then uses these adjustments as the new designated portion of the session content to be included in the note.

In some embodiments, prior to the note being generated by the system, a note UI is presented to the participant. The note UI includes a number of selectable options which determine the content of the note to be generated. In some embodiments, the note UI includes a selectable UI element which allows the user to adjust the amount of time of recording to be included when taking the note, which determines the designated portion of recorded material to be included, as described above. In some embodiments, the note can be categorized into one or more categories. For example, the participant can categorize the note as one or more of: an action item, an observation, or a reference. In some embodiments, one or more annotations can be added by the participant to the note. For example, a participant may be able to type some annotations which appear alongside the session content, which can be notes to oneself about the material. In some embodiments, notes can be customized in any of a number of additional ways, such as, e.g., selecting whether to include only audio, only video, only image captures, only a transcript, or some combination thereof. Many other such customizations or additions to the note can be contemplated for inclusion within a note UI. An example of a note UI will be described below with respect to FIG. 4.

In some embodiments, the system provides access to the requesting participant to the portion of the session content in the note upon demand. In some embodiments, the access is provided even while the current communication session is still in progress, so a participant can access and review note material during the communication session if needed. In other embodiments, access is provided only after the communication session has completed. In some embodiments, access is provided both during the communication session, and after the communication session has completed. The access is offered "upon demand" in the sense that the UI presented to the participant provides a selectable UI element which allows the participant to access past generates notes whenever the user likes.

In some embodiments, access can be provided in the form of exporting the generated note to one or more playback formats which can be stored on a local client device of the participant. For example, an MP4 video file may be automatically generated on a remote server, and provided for download by the participant for offline viewing whenever the user wishes. Similarly, a number of images corresponds to visual slides presented during the communication session may be provided for the participant to download and store on their local device.

In some embodiments, access can be provided in the form of a note playback UI which is presented to the requesting participant. This note playback UI can be presented upon the participant selecting a UI element for playing back previously generated notes. In some embodiments, the note playback UI can include one or more selectable options for accessing or initiating playback of portions of the session content in the generated note, or one or more previously generated notes associated with the participant. In some embodiments, the note playback UI can include access to previously generated notes from the current communication session, previously generated notes from previous communication sessions, or both. In some embodiments, selectable options for accessing or initiating playback of portions of the session content in the note or previously generated note(s) can include one or more of, e.g.: playing back session content at an adjusted rate of speed; displaying a generated transcript alongside session content; displaying a captured visual slide alongside session content; displaying one or more participant annotations alongside session content; or any other suitable selectable options for playback or access. In some embodiments, the note playback UI can include one or more search UI elements configured to enable the participant to search for previously generated notes to be accessed or played back. Such search functionality can potentially include searching within a title of a note, searching within annotations for the note, searching within a transcript included within the note, searching within included session content itself, or other suitable options for searching for notes. Examples of a note playback UI will be described below with respect to FIG. 5A and FIG. 5B.

In some embodiments, the system receives an indication that a number of requests to generate a note have been received from participants that exceeds a threshold number of requests within a designated window of time. For example, the system may receive an indication that over 10 participants in a class have requested a note to be generated within the timeframe of 13 minutes to 13:30 minutes into the communication session, representing a designated window of 30 seconds in which a threshold of 10 requests has been exceeded. Upon the system receiving this indication, but prior to receiving the request to generate the note from the participant in step 216, the system can display a recommended action within the UI for the participant. This recommended action can be a notification or message which appears within the UI, recommending the participant to pay attention to or request a note for the session content currently being produced within the communication session. In some embodiments, the recommended action can include the number of other participants who have requested a note during the designated window of time, or simply inform the participant that a large number of participants have requested a note. This recommended action may be intended to encourage the participant to take a note on the material being presented, because it may be deemed important by other participants. For example, other classmates might find this particular session content in the lecture to be noteworthy. In some embodiments, after the participant requests a note to be generated, the UI might inform the participant that other participants also requested a note during that window of time.

In some embodiments, at optional step 214, the system determines one or more segments within the communication session wherein participants beyond a threshold number of participants requested real-time notes to be generated for session content being produced within the communication session. In some embodiments, the system can make this determination by calculating, for each of a number of designated windows of time throughout the communication session, how many participants requested notes to be generated during that window of time. For example, the system can divide the length of the communication session into a number of 30-second segments. The system can then determine that 0 participants requested notes during some of those segments, 1 participant requested a note during some of those segments, 2 participants requested a note during some of those segments, and so on. Some segments may have, for example, more than 10 participants requesting notes. If the designated threshold number of participants is 10 participants, then any segment that had over 10 participants requesting notes is determined by the system as a segment with high note-taking participation.

At step 216, the system determines one or more engagement metrics for participants based on the participants requesting real-time notes to be generated during the communication session. Engagement metrics can be any metrics which relate to the engagement, or lack of engagement, of participants during the communication session, based on information about the note-taking that occurred during the communication session by various participants. In various embodiments, engagement metrics can include one or more of, e.g.: an average amount of engagement during the communication session, where engagement is measured by amount of notes requested by participants; slides, sections, or segments with the most active engagement and/or least active engagement from participants, where engagement is measured by amount of notes requested by participants; average number of notes requested to be generated per participant; and any other suitable engagement metrics pertaining to note-taking during the communication session.

In some embodiments, engagement metrics can include information about participants who engaged in note generation more than other participants, and/or participants who engaged in note generation less than other participants. In some embodiments, the participants are not mentioned by name but rather are generalized or aggregated to remove their identifying information. In other embodiments, the participants are mentioned by name.

At step 218, the system presents, to one or more participants of the communication session, information corresponding to at least a subset of the determined one or more engagement metrics. In some embodiments, the presenting of the information to these participants is performed in real time during the communication session. That is, one or more of the participants can be presented with information relating to the engagement metrics of the participants while the session is still underway and while any presentation material is still in the process of being presented. In some embodiments, the one or more presenting participants receive this information while they are still in the process of presenting. In some embodiments, non-presenting participants receive this information while the presentation is still underway. In some embodiments, rather than or in addition to presenting the information in real time, the system presents the information to the participants after the communication session has been terminated. That is, the information can be presented only after the communication session is over and the presentation has ended, or the information can be presented both while the meeting is underway and after it has ended. In some embodiments, the system additionally presents information about segments wherein participants beyond a threshold number of participants requested real-time notes to be generated. In these embodiments, these segments were determined in optional step 214, as described above.

In some embodiments, the information corresponding to the determined engagement metrics can include one or more visual representations of participant engagement during the communication session. For example, one of more graphs, charts, or visual breakdowns of engagement metrics can be presented as a part of the presentation to the participants. An example of this is described below with respect to FIG. 8. In some embodiments, a histogram or other graph can present segments with a high number of participants requesting notes. In some embodiments, the histogram can be presented and updated in real time while a session is underway.

In some embodiments, the information is presented to one or more host or presenting participants, but is not presented to non-host or non-presenting participants. For example, a host as well as a presenter can receive engagement analytics about the audience's engagement to the presentation, but the audience themselves do not receive access to these engagement analytics. In some embodiments, only the host or only presenting participants receive access to these engagement analytics. In some embodiments, the information is presented only to participants with granted access to the note analytics UI, whether those individuals with granted access are hosts, presenters, or non-presenting participants. Access may be granted only by individuals with special granting privileges.

In some embodiments, the information presented to the one or more participants of the communication session includes a demographic breakdown of one or more of the engagement metrics. For example, some of the information included in the note analytics UI can be presented in a way that breaks down participant engagement by, e.g., age, gender, race, country, income level, or any of a number of other demographics. In some use cases, for example, this may have the benefit of providing insight into engagement based on a number of factors which presenters, educators, administrators, or others may seek better understanding of in order to ensure that education can be as equitable as possible.

In some embodiments, the information is presented in a customized fashion to a participant based on the participant's engagement and/or requests to generate notes during the communication session. For example, the information may be presented to a participant, John, with one or more engagement metrics that are related to John in particular, e.g., the segments that John considered especially noteworthy, John's engagement over time during the communication session, John's percentage of time during the communication session where he was engagement, number of notes taken during the session, and more.

In some embodiments, the customized presentation for the participant includes presenting one or more engagement metrics which compare the participant's engagement metrics to other participants' engagement metrics for the communication session. For example, engagement metrics can be presented to John which compare John's engagement during the session to other participants' engagement during the session on average, or the number of notes John requested to be generated compared to the number the other participants requested on average. In some embodiments, segments may be presented to the participant in assorted colors or other indications marking where the participant was especially active compared to where other participants were especially active.

In some embodiments, the customized presentation for the participant includes presenting one or more engagement metrics which compare the participant's engagement metrics for the communication session to the participant's engagement metrics for one or more previous communication sessions. For example, John's engagement during the session can be compared with various metrics to John's engagement during one or more previously attended communication sessions, or to John's engagement during all past attended communication sessions on average. The number of notes John requested can be similarly compared to the number of notes he requested in previous meetings.

In some embodiments, the system can present one or more previously generated notes to be accessed or played back. In some embodiments, the system can present a note playback UI, as described above, for any generated notes associated with that participant within the current communication session and/or previous communication sessions. In some embodiments, the participant can select one of those notes within the UI for a more detailed view of the note, including annotations, transcript for any speech which occurred during that recorded session content, options to export the note, categories for the note, which meeting the note was taken during, the length of time of the note, and more. The participant can also select to play back the note, pause the note, mute the note's audio, or skip to a different time within the note. Examples of such note playback UIs will be described below with respect to FIG. 6 and FIG. 7.

In some embodiments, one or more of the generated notes may be designated as shared notes. Participants may opt to share a note with other participants, in which case the note can be included for access and playback by participants other than the participant who requested the note to be generated. In some embodiments, a note generation UI or other UI can include a UI element which designates a note to be shared. This UI element may be a checkbox which can be checked or unchecked, for example. In some embodiments, an administrator or host may have the option to disable or enable sharing in settings for the session. In some embodiments, the information presented in the note analytics section can include a summary and/or highlights of shared clips. In some embodiments, this information can be generated automatically based on the content of the shared clips, a transcript of the session, and/or other data.

In some embodiments, the information presented to the one or more participants can include an automatically generated highlights section which allows playback of a montage of session moments with high engagement activity. In some embodiments, this can be generated based on determined segments with engagement activity beyond a specified threshold of engagement, or other determined engagement metrics.

In some embodiments, one or more of the notes generated during communication sessions can be linked in external documents or other notes. In some embodiments, one of the engagement metrics presented to participants can include notes which have been linked to the most by other notes or documents. In some embodiments, the link may be in the form of a Universal Resource Locator ("URL"), QR code, or other method of linking to or referencing content.

Figure 3:
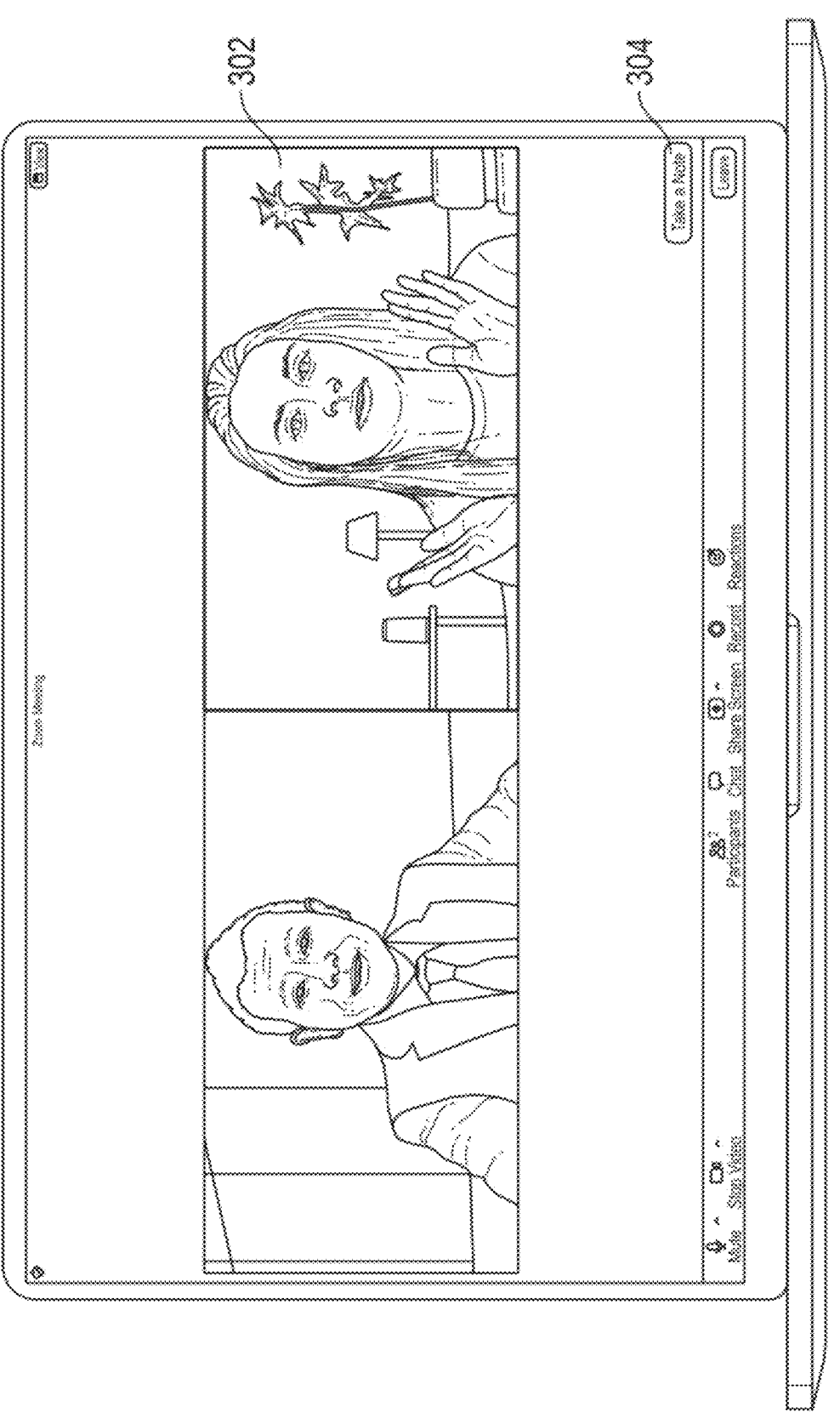
FIG. 3 is a diagram illustrating one example embodiment of a user interface (hereinafter "UI") for a communication session with a note generation UI element, according to some embodiments.

FIG. 3 is a diagram illustrating one example embodiment of a user interface (hereinafter "UI") for a communication session with a note generation UI element, according to some embodiments.

The illustration depicts a UI that a particular participant is viewing on a screen of the participant's client device. Two participant windows 302 are displayed within the UI, side by side. Within each participant window is a video. The video in each of the participant windows is a live video feed captured via a camera or other device that is either built into or connected to the client device of that participant, then streamed to the UIs of participants. Also appearing in the bottom right corner of the UI is a UI element 304 labeled "Take a Note", which represents a selectable UI element for the participant to request a note to be generated. The participant can choose to click on, or otherwise interact with this UI element. Upon interacting with the element, the system receives a request for a note to be generated by that requesting participant. In some embodiments, a note UI may then appear for the participant to customize the note or add annotations to the note. In other embodiments, the system may simply generate the note without requiring any additional input from the participant.

In some embodiments, a UI element may not need to be selected in order for a note request to be initiated. For example, as described above, the system may automatically initiate a request to generate a note for the participant upon detecting or receiving indication of one or more automated note taking conditions. A note or several notes can thus be generated without any manual input from the participant.

Figure 4:
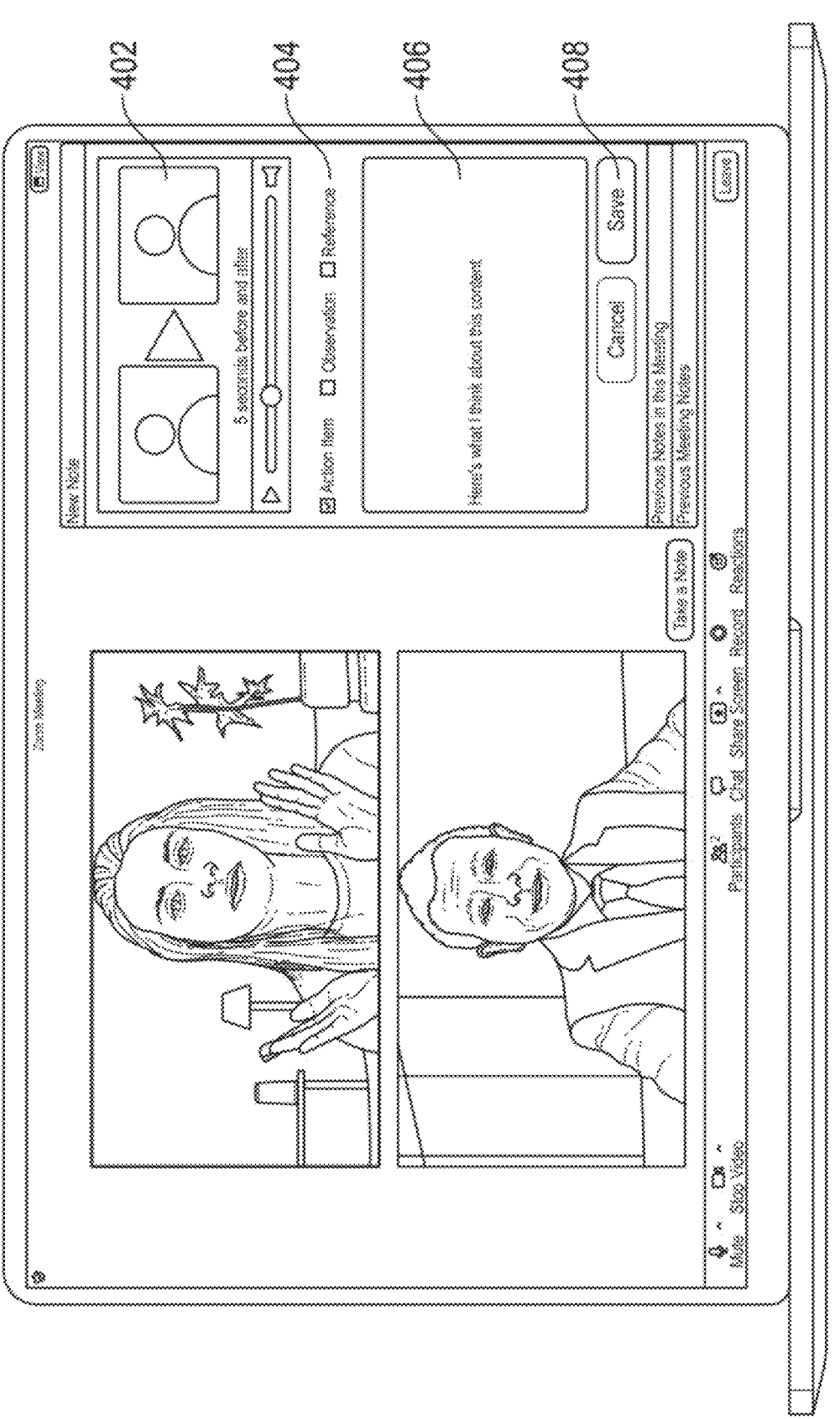
FIG. 4 is a diagram illustrating one example embodiment of a UI for generating a new note during a communication session, according to some embodiments.

FIG. 4 is a diagram illustrating one example embodiment of a UI for generating a new note during a communication session, according to some embodiments.

The illustration shows a note UI which can be presented to the participant upon the participant requesting a note to be generated. A preview UI element 402 can show previews of the beginning visual session content as well as the ending visual session content within the designated portion of session content to be included in the generated note. Below the preview UI element, a slider can provide the participant with the ability to adjust the designated portion of content to be included based on time. In this example, the slider is currently set to "5 seconds before and after", meaning content from 5 seconds prior to the system receiving the request, as well as content from 5 seconds after the system receiving the request, will be included in the generated note.

Categories 404 may allow the user to select one or more categories to place the note within. In this example, the participant has selected to categorize the note as an "action item", and not as an "observation" or "reference". In some embodiments, a participant may later sort previously recorded notes based on category, in order to retrieve, access, and play back notes of interest. In some embodiments, participants may have the option within a settings UI or other UI to add, remove, or modify categories to place notes within.

An annotation field 406 may allow the participant to add annotations to be included in the note. This allows participants to include notes to themselves within their notes, for further reference or study, or to jog the participant's memory on what the session content was about when accessing the note later. UI elements 408 include options to "cancel" or "save" the note, allowing the participant to proceed with generating the note or cancel the generation of the note.

Figure 5A:
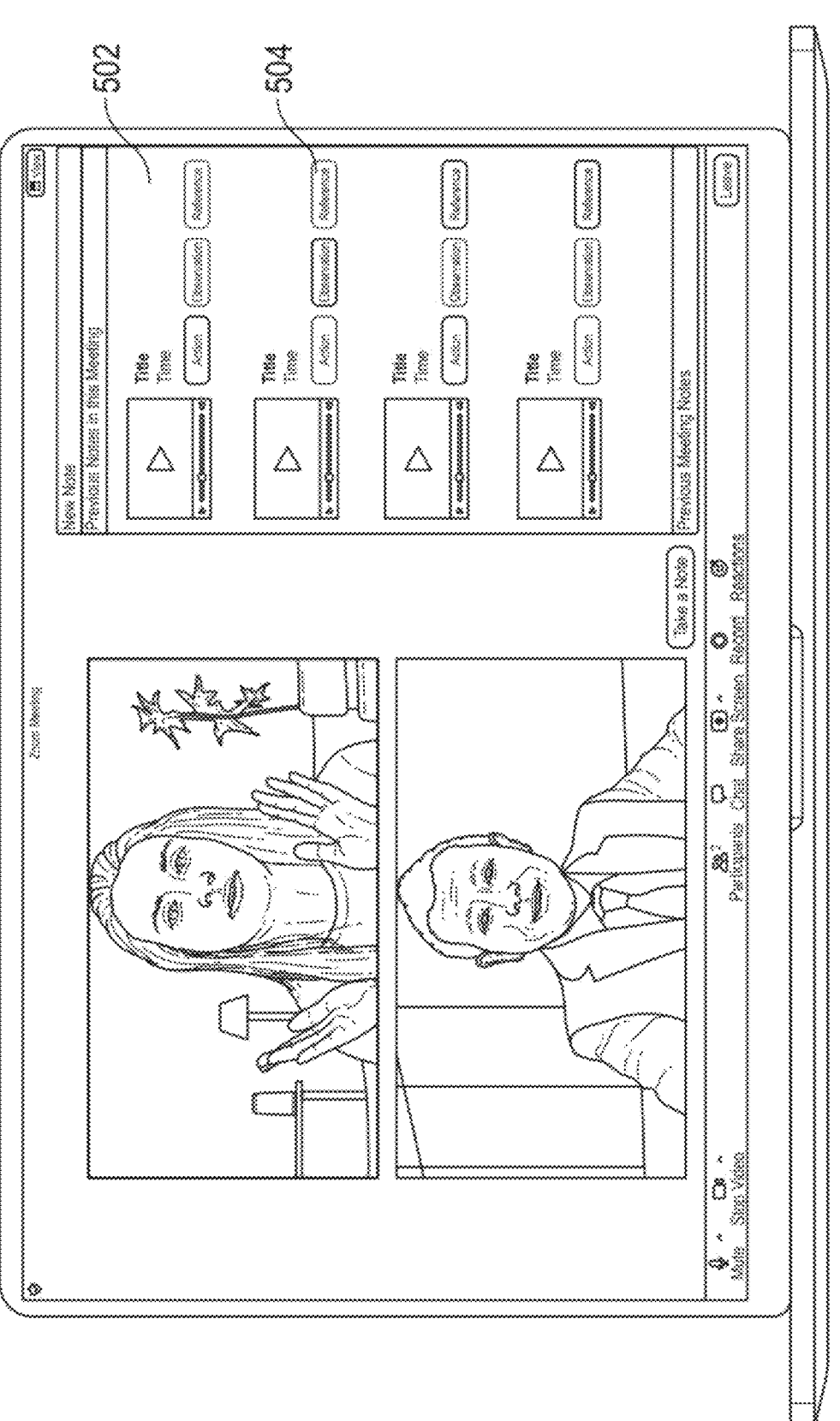
FIG. 5A is a diagram illustrating one example embodiment of a UI for accessing and playing back previously recorded notes from the communication session, according to some embodiments.

FIG. 5A is a diagram illustrating one example embodiment of a UI for accessing and playing back previously recorded notes from the communication session, according to some embodiments. A number of UI elements 502 each provide a preview of a previously generated note from the current communication session, a slider indicating the current playback time of the note if it is being played back by the participant, and options to pause or mute the playback. The participant may click on the preview of the note to play back the note. UI elements 504 additionally display the one or more categories which the note has been categorized as by the participant.

Figure 5B:
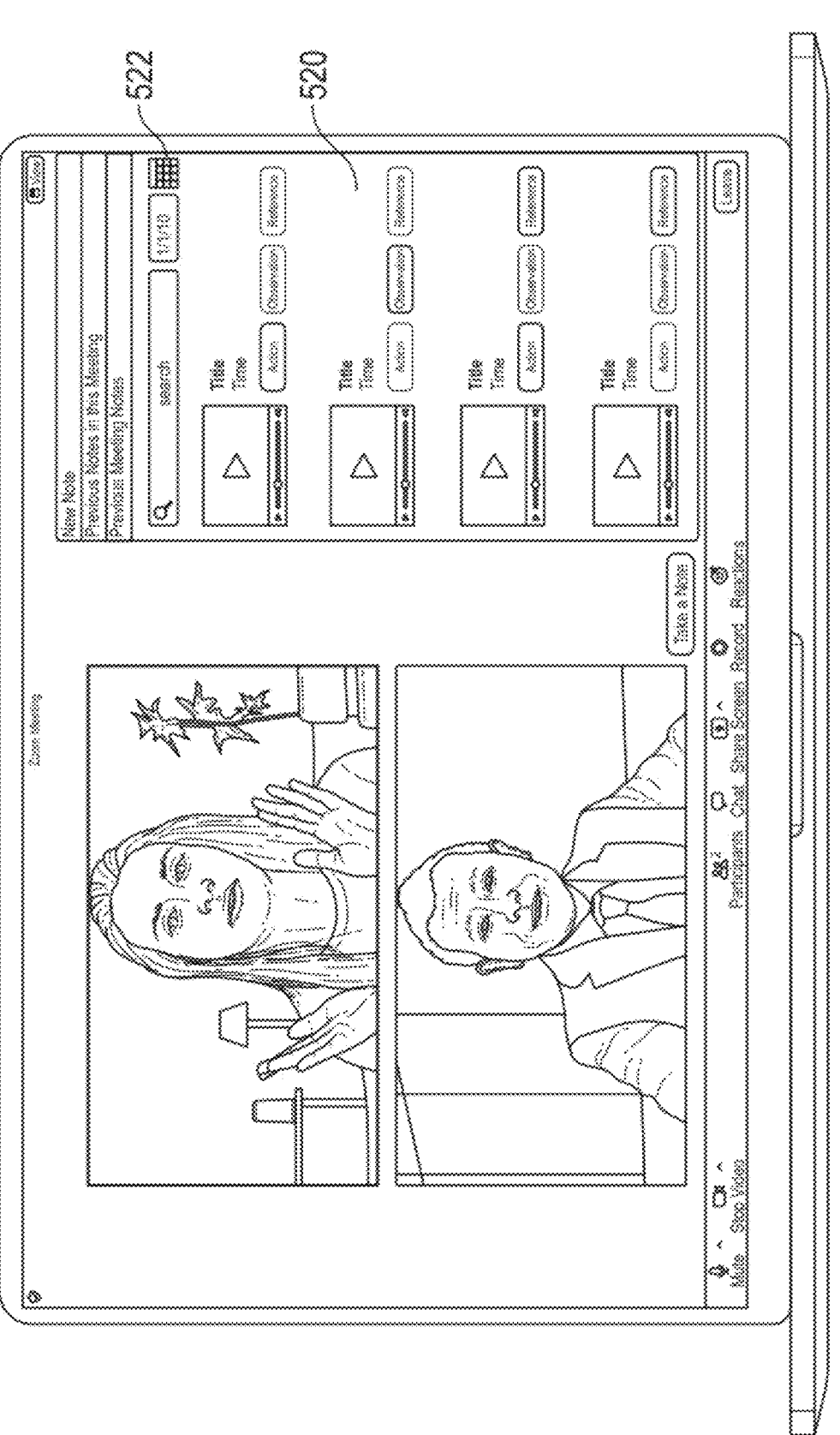
FIG. 5B is a diagram illustrating one example embodiment of a UI for accessing and playing back previously recorded notes from previous communication sessions, according to some embodiments.

FIG. 5B is a diagram illustrating one example embodiment of a UI for accessing and playing back previously recorded notes from previous communication sessions, according to some embodiments.

The illustration in FIG. 5B is similar to the illustrated in FIG. 5A, except that the notes displayed within the note playback UI are notes from previous communication sessions (i.e., "previous meeting notes"), rather than notes from the current communication session. The participant may select between tabs of "new note", "previous notes in this meeting", and "previous meeting notes" to access different UIs for note generation, note playback for notes in the current session, and note playback for notes from previous sessions, respectively. A number of search UI elements 522 are displayed, which allow a user to search for and filter results of notes from previous sessions. A number of note playback UI elements 520 also are displayed, as in FIG. 5A.

Figure 6:
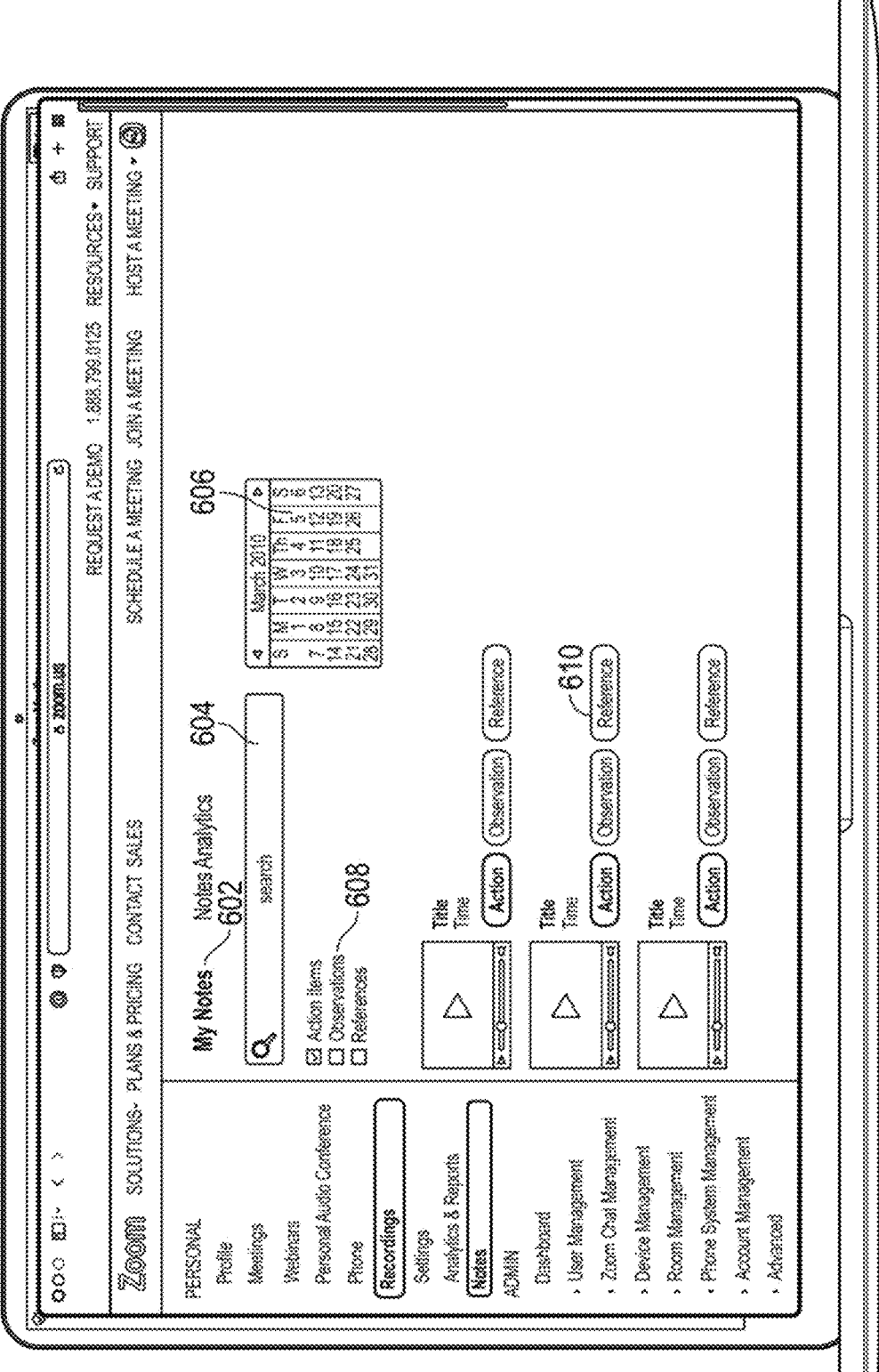
FIG. 6 is a diagram illustrating one example embodiment of a UI for accessing and playing back previously recorded notes, according to some embodiments.

FIG. 6 is a diagram illustrating one example embodiment of a UI for accessing and playing back previously recorded notes, according to some embodiments.

In some embodiments, the system can present a note playback UI for any generated notes associated with that participant within the current communication session and/or previous communication sessions. In the example, the user navigates to a section 602 labeled "My Notes" to access this note playback UI. A search field 604 can appear which allows the user to search within their collection of notes in several ways to display results of notes to be played back. For example, the user can search within a note title, meeting title, annotations, the session content itself, or any of a number of other suitable ways to search notes. In some embodiments, a calendar 606 appears which allows the user to select individual days where notes were generated, in order to find notes to be accessed and played back. In some embodiments, categories 608 for notes can also be selected to filter notes based only on those categories. In the example, the category "Action Items" is selected, which results in the notes displayed being filtered to only notes categorized as Action Items. Notes 610 are displayed in the remaining UI space, which can be previewed, played back, or, in some embodiments, clicked on for a more detailed view, as will be described below with respect to FIG. 7.

Figure 7:
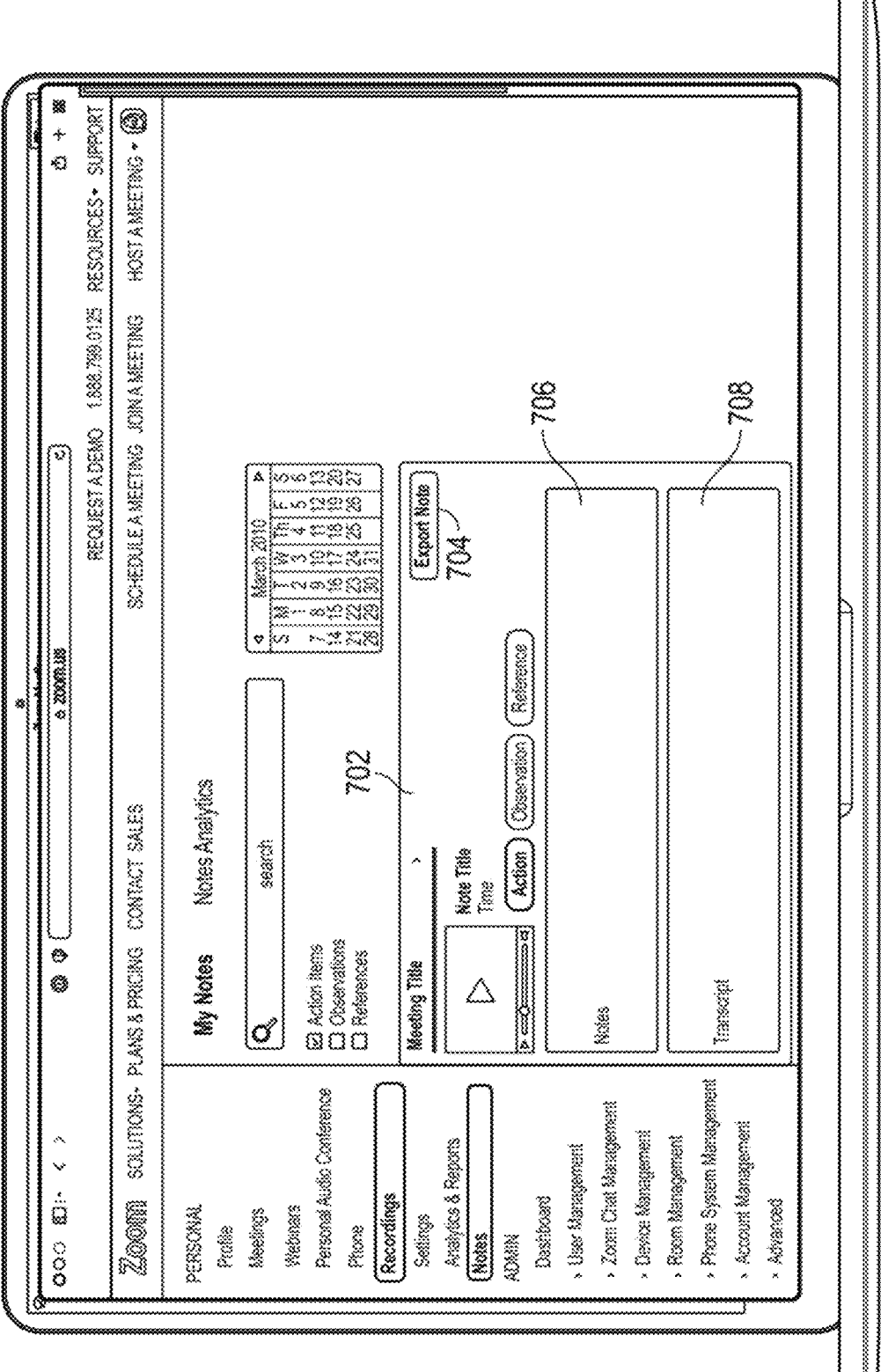
FIG. 7 is a diagram illustrating one example embodiment of a UI for a detailed note view, according to some embodiments.

FIG. 7 is a diagram illustrating one example embodiment of a UI for a detailed note view, according to some embodiments.

In some embodiments, the participant viewing the note playback UI from FIG. 6 can select one of the notes within the UI for a more detailed view of the note 702, including, e.g., annotations 706, a transcript 708 for any speech which occurred during that recorded session content, options to export the note 704, which meeting the note was taken during, the length of time of the note, and more. The participant can also select to play back the note, pause the note, mute the note's audio, or skip to a different time within the note.

Figure 8:
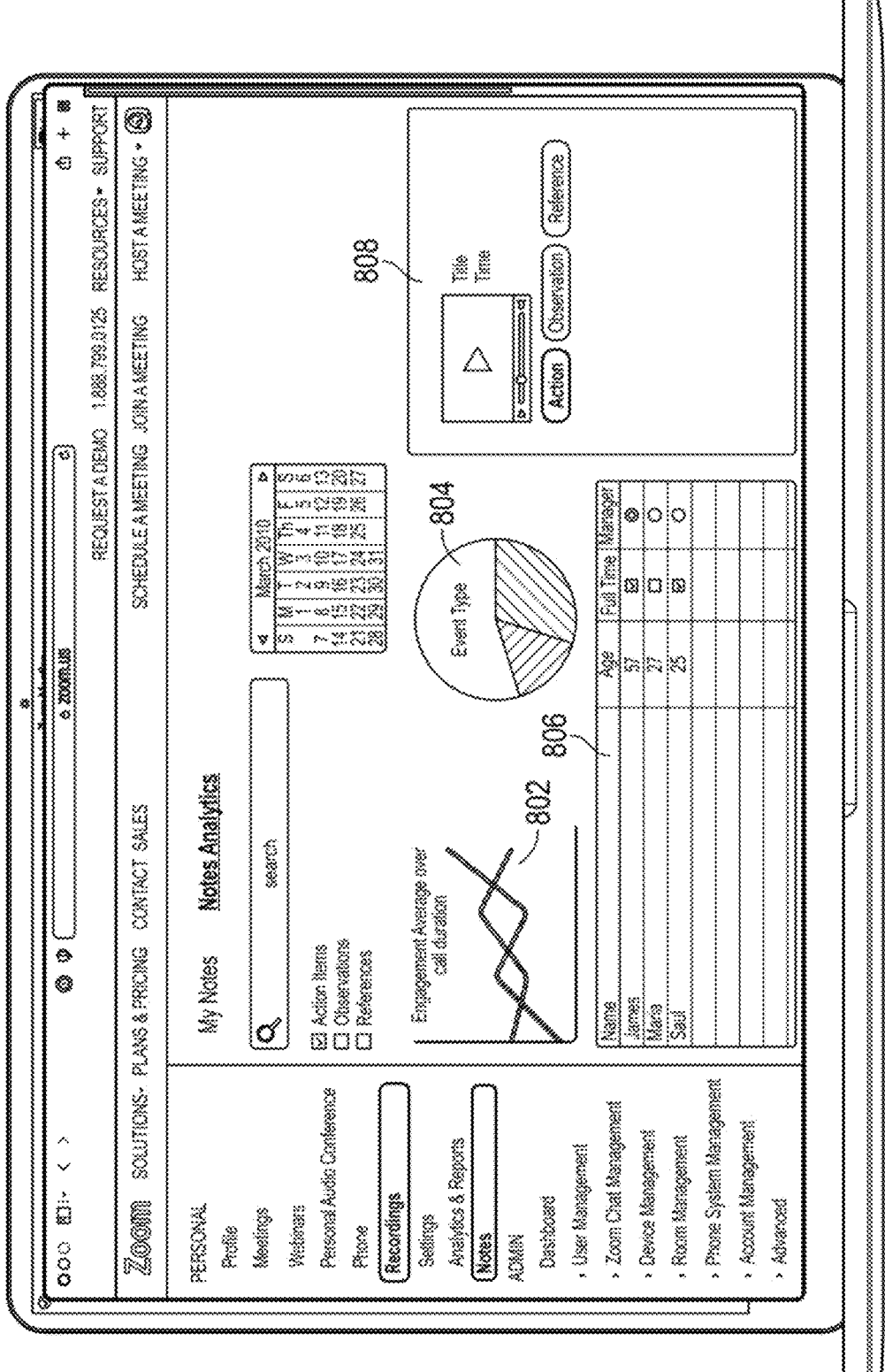
FIG. 8 is a diagram illustrating one example embodiment of a UI for note analytics, according to some embodiments.

FIG. 8 is a diagram illustrating one example embodiment of a UI for note analytics, according to some embodiments.

If the participant navigates to a note analytics section of the UI, labeled in this example as "Note Analytics", then the participant can see a presentation of information corresponding to engagement metrics of participants during the session. In some embodiments, segments of the session with high engagement may also be presented in the note analytics sections. In this example, the determined segments are shown in information 802 which breaks down engagement average over the duration of the communication session. These can be along multiple lines. For example, one line may relate to number of notes generated, while another may relate to whether the participant was actively engaged, e.g., had the session open in an active window on their desktop, or was annotating notes about the session, etc. A visual representation of engagement metrics 804 is also presented, breaking down the notes generated based on event type within a pie chart. Additional information 806 is listed about the participants who attended the meeting. To the right, a note playback section 808 is presented which allows the participant to view and playback a representative note that was captured during the session. In some embodiments, a presenter or a host would access this Note Analytics section, while in other embodiments, participants themselves would be able to access the section. Any such combination of participants can potentially access the section.

Figure 9:
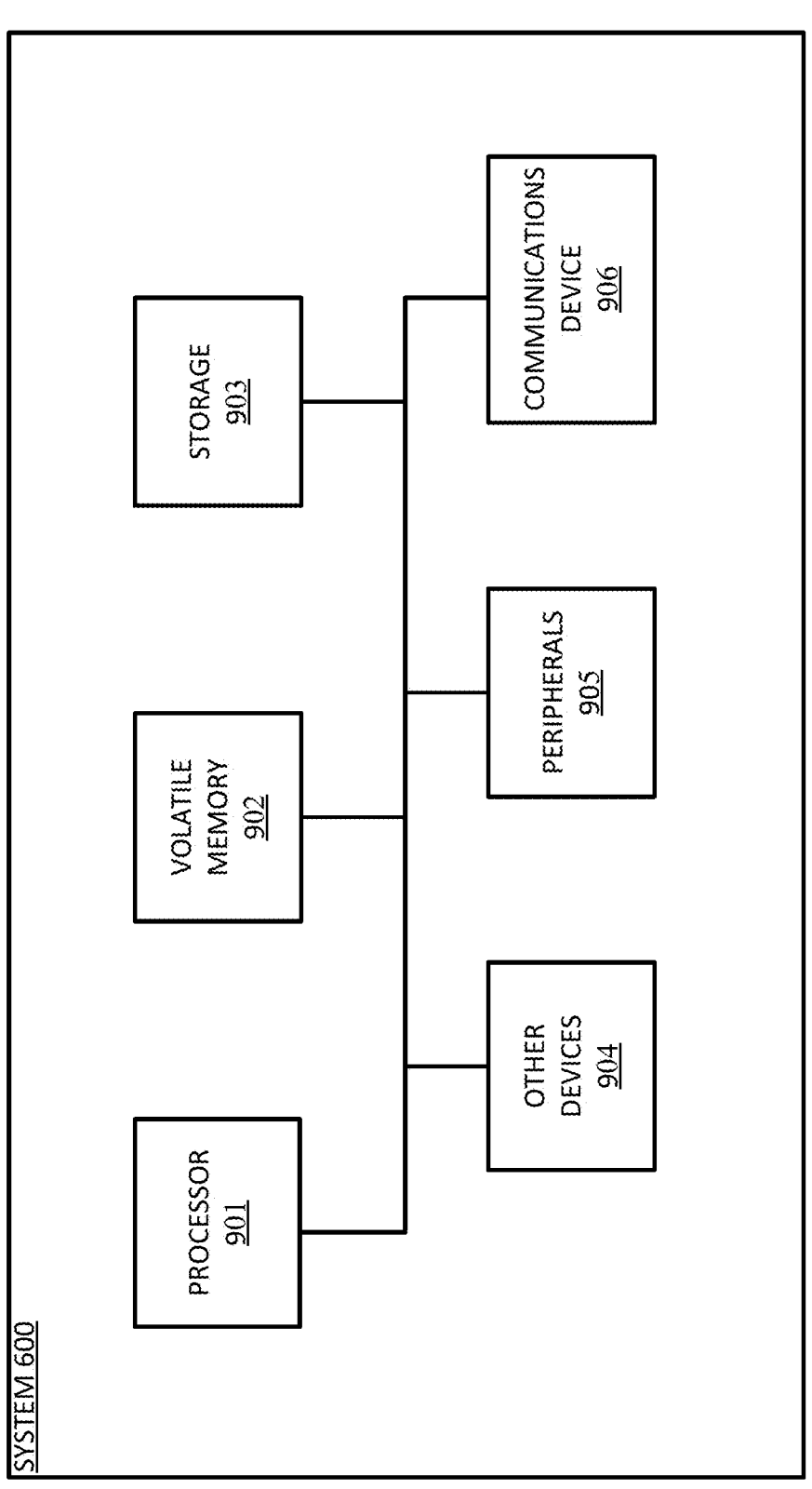
FIG. 9 is a diagram illustrating an exemplary computer that may perform processing in some embodiments.

FIG. 9 is a diagram illustrating an exemplary computer that may perform processing in some embodiments. Exemplary computer 900 may perform operations consistent with some embodiments. The architecture of computer 900 is exemplary. Computers can be implemented in a variety of other ways. A wide variety of computers can be used in accordance with the embodiments herein.

Processor 901 may perform computing functions such as running computer programs. The volatile memory 902 may provide temporary storage of data for the processor 901. RAM is one kind of volatile memory. Volatile memory typically requires power to maintain its stored information. Storage 903 provides computer storage for data, instructions, and/or arbitrary information. Non-volatile memory, which can preserve data even when not powered and including disks and flash memory, is an example of storage. Storage 903 may be organized as a file system, database, or in other ways. Data, instructions, and information may be loaded from storage 903 into volatile memory 902 for processing by the processor 901.

The computer 900 may include peripherals 905. Peripherals 905 may include input peripherals such as a keyboard, mouse, trackball, video camera, microphone, and other input devices. Peripherals 905 may also include output devices such as a display. Peripherals 905 may include removable media devices such as CD-R and DVD-R recorders/players. Communications device 906 may connect the computer 100 to an external medium. For example, communications device 906 may take the form of a network adapter that provides communications to a network. A computer 900 may also include a variety of other devices 904. The various components of the computer 900 may be connected by a connection medium such as a bus, crossbar, or network.

It will be appreciated that the present disclosure may include any one and up to all of the following examples.

Example 1. A method comprising: maintaining a communication session with a plurality of participants, wherein session content is presented during the communication session to the plurality of participants, and wherein participants can request real-time notes to be generated for the session content to be captured; determining one or more engagement metrics for participants based on the participants requesting real-time notes to be generated during the communication session; and presenting, to one or more participants of the communication session, information corresponding to at least a subset of the determined one or more engagement metrics.

Example 2. The method of Example 1, further comprising: determining one or more segments within the communication session wherein participants beyond a threshold number of participants requested real-time notes to be generated for session content being produced within the communication session; and further presenting, to the one or more participants of the communication session, information corresponding to the determined one or more segments.

Example 3. The method of any of Examples 1-2, wherein the presenting of the information to the one or more participants of the communication session is performed in real time during the communication session.

Example 4. The method of any of Examples 1-3, wherein the presenting of the information to the one or more participants of the communication session is performed after the communication session has been terminated.

Example 5. The method of any of Examples 1-4, further comprising: presenting one or more previously generated notes to be accessed or played back.

Example 6. The method of any of Examples 1-5, wherein the information corresponding to at least a subset of the determined engagement metrics comprises one or more visual representations of participant engagement during the communication session.

Example 7. The method of any of Examples 1-6, wherein the one or more engagement metrics comprises one or more of: engagement average during the communication session, slides or sections with the most active engagement from participants, and average number of notes requested to be generated per participant.

Example 8. The method of any of Examples 1-7, wherein the one or more engagement metrics comprises information about participants who engaged in note generation more than other participants and/or participants who engaged in note generation less than other participants.

Example 9. The method of any of Examples 1-8, wherein the information is presented to one or more host or presenting participants but not presented to non-host or non-presenting participants.

Example 10. The method of any of Examples 1-9, wherein the information is presented only to participants with granted access to the note analytics UI.

Example 11. The method of any of Examples 1-10, wherein the information is presented in a customized fashion to a participant based on the participant's engagement and/or requests to generate notes during the communication session.

Example 12. The method of Example 11, wherein the customized presentation for the participant comprises presenting one or more engagement metrics which compare the participant's engagement metrics to other participants' engagement metrics for the communication session.

Example 13. The method of any of Examples 11-12, wherein the customized presentation for the participant comprises presenting one or more engagement metrics which compare the participant's engagement metrics for the communication session to the participant's engagement metrics for one or more previous communication sessions.

Example 14. A communication system comprising one or more processors configured to perform the operations of: maintaining a communication session with a plurality of participants, wherein session content is presented during the communication session to the plurality of participants, and wherein participants can request real-time notes to be generated for the session content to be captured; determining one or more engagement metrics for participants based on the participants requesting real-time notes to be generated during the communication session; and presenting, to one or more participants of the communication session, information corresponding to at least a subset of the determined one or more engagement metrics.

Example 15. The communication system of Example 14, wherein the one or more processors are further configured to perform the operations of: determining one or more segments within the communication session wherein participants beyond a threshold number of participants requested real-time notes to be generated for session content being produced within the communication session; and further presenting, to the one or more participants of the communication session, information corresponding to the determined one or more segments.

Example 16. The communication system of any of Examples 14-15, wherein the presenting of the information to the one or more participants of the communication session is performed in real time during the communication session.

Example 17. The communication system of any of Examples 14-16, wherein the presenting of the information to the one or more participants of the communication session is performed after the communication session has been terminated.

Example 18. The communication system of any of Examples 14-17, wherein the one or more processors are further configured to perform the operation of: presenting one or more previously generated notes to be accessed or played back.

Example 19. The communication system of any of Examples 14-18, wherein the information corresponding to at least a subset of the determined engagement metrics comprises one or more visual representations of participant engagement during the communication session.

Example 20. The communication system of any of Examples 14-19, wherein the one or more engagement metrics comprises one or more of: engagement average during the communication session, slides or sections with the most active engagement from participants, and average number of notes requested to be generated per participant.

Example 21. The communication system of any of Examples 14-20, wherein the one or more engagement metrics comprises information about participants who engaged in note generation more than other participants and/or participants who engaged in note generation less than other participants.

Example 22. The communication system of any of Examples 14-21, wherein the information is presented to one or more host or presenting participants but not presented to non-host or non-presenting participants.

Example 23. The communication system of any of Examples 14-22, wherein the information is presented only to participants with granted access to the note analytics UI.

Example 24. The communication system of any of Examples 14-23, wherein the information is presented in a customized fashion to a participant based on the participant's engagement and/or requests to generate notes during the communication session.

Example 25. The communication system of Example 24, wherein the customized presentation for the participant comprises presenting one or more engagement metrics which compare the participant's engagement metrics to other participants' engagement metrics for the communication session.

Example 26. The communication system of any of Examples 24-25, wherein the customized presentation for the participant comprises presenting one or more engagement metrics which compare the participant's engagement metrics for the communication session to the participant's engagement metrics for one or more previous communication sessions.

Example 27. The communication system of any of Examples 14-26, wherein the information presented to the one or more participants of the communication session comprises a demographic breakdown of one or more of the engagement metrics.

Example 28. The communication system of any of Examples 14-27, wherein the information presented to the one or more participants comprises one or more shared notes from other participants to be accessed or played back.

Example 29. The communication system of any of Examples 14-28, wherein the information presented to the one or more participants comprises an automatically generated highlights section which allows playback of a montage of session moments with high engagement activity.

Example 30. The communication system of any of Examples 14-29, wherein at least one of the determined engagement metrics relates to notes which have been linked to or referenced from external documents or other notes.

Example 31. A non-transitory computer-readable medium containing instructions for presenting engagement analytics from a communication session, comprising: instructions for maintaining a communication session with a plurality of participants, wherein session content is presented during the communication session to the plurality of participants, and wherein participants can request real-time notes to be generated for the session content to be captured; instructions for determining one or more engagement metrics for participants based on the participants requesting real-time notes to be generated during the communication session; and instructions for presenting, to one or more participants of the communication session, information corresponding to at least a subset of the determined one or more engagement metrics.

Example 32. The non-transitory computer-readable medium of Example 31, further comprising: instructions for determining one or more segments within the communication session wherein participants beyond a threshold number of participants requested real-time notes to be generated for session content being produced within the communication session; and instructions for further presenting, to the one or more participants of the communication session, information corresponding to the determined one or more segments.

Example 33. The non-transitory computer-readable medium of any of Examples 31-32, wherein the presenting of the information to the one or more participants of the communication session is performed in real time during the communication session.

Example 34. The non-transitory computer-readable medium of any of Examples 31-33, wherein the presenting of the information to the one or more participants of the communication session is performed after the communication session has been terminated.

Example 35. The non-transitory computer-readable medium of any of Examples 31-34, further comprising: instructions for presenting one or more previously generated notes to be accessed or played back.

Example 36. The non-transitory computer-readable medium of any of Examples 31-35, wherein the information corresponding to at least a subset of the determined engagement metrics comprises one or more visual representations of participant engagement during the communication session.

Example 37. The non-transitory computer-readable medium of any of Examples 31-36, wherein the one or more engagement metrics comprises one or more of: engagement average during the communication session, slides or sections with the most active engagement from participants, and average number of notes requested to be generated per participant.

Example 38. The non-transitory computer-readable medium of any of Examples 31-37, wherein the one or more engagement metrics comprises information about participants who engaged in note generation more than other participants and/or participants who engaged in note generation less than other participants.

Example 39. The non-transitory computer-readable medium of any of Examples 31-38, wherein the information is presented to one or more host or presenting participants but not presented to non-host or non-presenting participants.

Example 40. The non-transitory computer-readable medium of any of Examples 31-39, wherein the information is presented only to participants with granted access to the note analytics UI.

Example 41. The non-transitory computer-readable medium of any of Examples 31-40, wherein the information is presented in a customized fashion to a participant based on the participant's engagement and/or requests to generate notes during the communication session.

Example 42. The non-transitory computer-readable medium of Example 41, wherein the customized presentation for the participant comprises presenting one or more engagement metrics which compare the participant's engagement metrics to other participants' engagement metrics for the communication session.

Example 43. The non-transitory computer-readable medium of any of Examples 41-42, wherein the customized presentation for the participant comprises presenting one or more engagement metrics which compare the participant's engagement metrics for the communication session to the participant's engagement metrics for one or more previous communication sessions.

Example 44. The non-transitory computer-readable medium of any of Examples 31-43, wherein the information presented to the one or more participants of the communication session comprises a demographic breakdown of one or more of the engagement metrics.

Example 45. The non-transitory computer-readable medium of any of Examples 31-44, wherein the information presented to the one or more participants comprises one or more shared notes from other participants to be accessed or played back.

Example 46. The non-transitory computer-readable medium of any of Examples 31-45, wherein the information presented to the one or more participants comprises an automatically generated highlights section which allows playback of a montage of session moments with high engagement activity.

Example 47. The non-transitory computer-readable medium of any of Examples 31-46, wherein at least one of the determined engagement metrics relates to notes which have been linked to or referenced from external documents or other notes.

An aspect includes a method that includes determining one or more segments of a communication session when a threshold number of participant devices of the communication session requesting to capture notes is exceeded. The method may include transmitting, to at least one of the participant devices, information associated with the one or more segments.

An aspect includes a system that comprises a server. The server may be configured to determine one or more segments of a communication session when a threshold number of participant devices of the communication session that request to capture notes is exceeded. The server may be configured to transmit, to at least one of the participant devices, information associated with the one or more segments.

An aspect may include a non-transitory computer-readable medium comprising instructions, that when executed by a processor, cause the processor to perform operations. The operations may include determining one or more segments of a communication session when a threshold number of participant devices of the communication session requesting to capture notes is exceeded. The operations may include transmitting, to at least one of the participant devices, information associated with the one or more segments.

An aspect includes a method that includes facilitating a communication session with participant devices that are configured to transmit requests to capture notes. The method may include determining one or more segments of the communication session when a threshold number of participant devices of the participant devices that requested to capture the notes is exceeded. The method may include transmitting, to a participant device of the participant devices, information associated with the one or more segments.

An aspect includes a system that comprises a server and participant devices. The participant devices may be configured to transmit requests to capture notes. The server may be configured to facilitate a communication session with the participant devices. The server may be configured to determine one or more segments of the communication session when a threshold number of participant devices of the participant devices that requested to capture the notes is exceeded. The server may be configured to transmit, to a participant device of the participant devices, information associated with the one or more segments.

An aspect may include a non-transitory computer-readable medium comprising instructions, that when executed by a processor, cause the processor to perform operations. The operations may include facilitating a communication session with participant devices that are configured to transmit requests to capture notes. The operations may include determining one or more segments of the communication session when a threshold number of participant devices of the participant devices that requested to capture the notes is exceeded. The operations may include transmitting, to a participant device of the participant devices, information associated with the one or more segments.

In one or more aspects, the information may be transmitted to the participant device in real-time during the communication session. In one or more aspects, the information may be transmitted to the participant device after the communication session has been terminated. In one or more aspects, one or more engagement metrics for the participant devices may be determined based on the requests, wherein the one or more engagement metrics comprises an engagement average during the communication session. In one or more aspects, one or more engagement metrics for the participant devices may be determined based on the requests, wherein the one or more engagement metrics comprises information about the participant devices that engaged in note generation more than other participant devices. In one or more aspects, one or more engagement metrics for the participant devices may be determined based on the requests, wherein the one or more engagement metrics comprises information about the participant devices that engaged in note generation less than other participant devices. In one or more aspects, the information may be transmitted to the participant devices with access to a note analytics user interface. In one or more aspects, the information may be transmitted to the participant device based on at least one of an associated engagement or a number of requests to generate notes during the communication session. In one or more aspects, one or more engagement metrics for the participant devices may be determined based on the requests, wherein the one or more engagement metrics comprises slides or sections with the highest active engagement from participant devices. In one or more aspects, one or more engagement metrics for the participant devices may be determined based on the requests, wherein the one or more engagement metrics comprises information about the participant devices that engaged in note generation. In one or more aspects, one or more engagement metrics for the participant devices may be determined based on the requests, wherein the one or more engagement metrics comprises an average number of notes requested per participant device.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method, comprising:
   determining one or more segments of a communication session when a threshold number of participant devices of the communication session requesting to capture notes is exceeded; and
   transmitting, to at least one of the participant devices, information associated with the one or more segments.

2. The method of claim 1, wherein transmitting the information to the at least one of the participant devices is performed in real-time during the communication session.

3. The method of claim 1, wherein transmitting the information to the at least one of the participant devices is performed after the communication session has ended.

4. The method of claim 1, further comprising:
   determining one or more engagement metrics for the participant devices based on requests to capture notes, wherein the one or more engagement metrics comprises an engagement average during the communication session.

5. The method of claim 1, further comprising:
determining one or more engagement metrics for the participant devices based on requests to capture notes, wherein the one or more engagement metrics comprises information about the participant devices that engaged in more note generation than other participant devices.

6. The method of claim 1, wherein the information is transmitted to participant devices that have access to a note analytics user interface.

7. The method of claim 1, wherein the information is transmitted to the at least one of the participant devices based on at least one of an associated engagement or a number of requests to capture notes during the communication session.

8. A system, comprising:
a server configured to:
determine one or more segments of a communication session when a threshold number of participant devices of the communication session that request to capture notes is exceeded; and
transmit, to at least one of the participant devices, information associated with the one or more segments.

9. The system of claim 8, wherein the server is further configured to:
determine one or more engagement metrics for the participant devices based on requests to capture notes, wherein the one or more engagement metrics comprises slides or sections with a highest active engagement from participant devices.

10. The system of claim 8, wherein the server is further configured to:
determine one or more engagement metrics for the participant devices based on requests to capture notes, wherein the one or more engagement metrics comprises information about the participant devices that engaged in note generation.

11. The system of claim 8, wherein the server is further configured to:
determine one or more engagement metrics for the participant devices based on requests to capture notes, wherein the one or more engagement metrics comprises information about the participant devices that engaged in less note generation than other participant devices.

12. The system of claim 8, wherein the information is transmitted to participant devices that have access to a note analytics user interface.

13. The system of claim 8, wherein the information is transmitted to the at least one of the participant devices based on an associated engagement.

14. The system of claim 8, wherein the information is transmitted to the at least one of the participant devices based on a number of requests to generate notes during the communication session.

15. A non-transitory computer-readable medium comprising instructions, that when executed by a processor, cause the processor to perform operations comprising:
determining one or more segments of a communication session when a threshold number of participant devices of the communication session requesting to capture notes is exceeded; and
transmitting, to at least one of the participant devices, information associated with the one or more segments.

16. The non-transitory computer-readable medium of claim 15, wherein transmitting the information to the at least one of the participant devices is performed in real-time.

17. The non-transitory computer-readable medium of claim 15, wherein transmitting the information to the at least one of the participant devices is performed after the communication session has been terminated.

18. The non-transitory computer-readable medium of claim 15, wherein the operations further comprise:
determining one or more engagement metrics for the participant devices based on requests to capture notes, wherein the one or more engagement metrics comprises an average number of notes requested per participant device.

19. The non-transitory computer-readable medium of claim 15, wherein the operations further comprise:
determining one or more engagement metrics for the participant devices based on requests to capture notes, wherein the one or more engagement metrics comprises information about the participant devices that engaged in more note generation than other participant devices.

20. The non-transitory computer-readable medium of claim 15, wherein the information is transmitted to the at least one of the participant devices that have access to a note analytics user interface.

\* \* \* \* \*